July 1, 1969
J. G. FRANCIS
3,452,525
PICKER FOR ASPARAGUS AND LIKE PRODUCTS AND PROCESS
OF PICKING SUCH PRODUCTS
Filed Oct. 22, 1965
Sheet 1 of 3
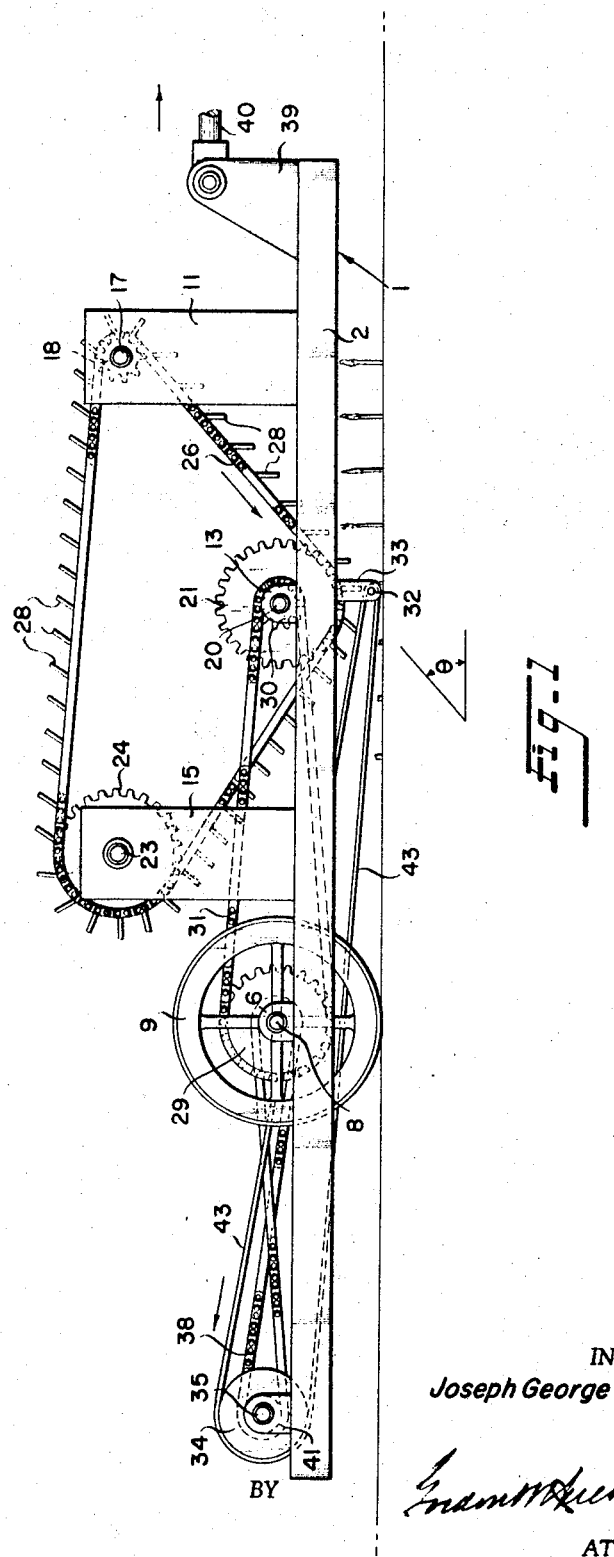
INVENTOR
Joseph George Francis
BY
ATTORNEY

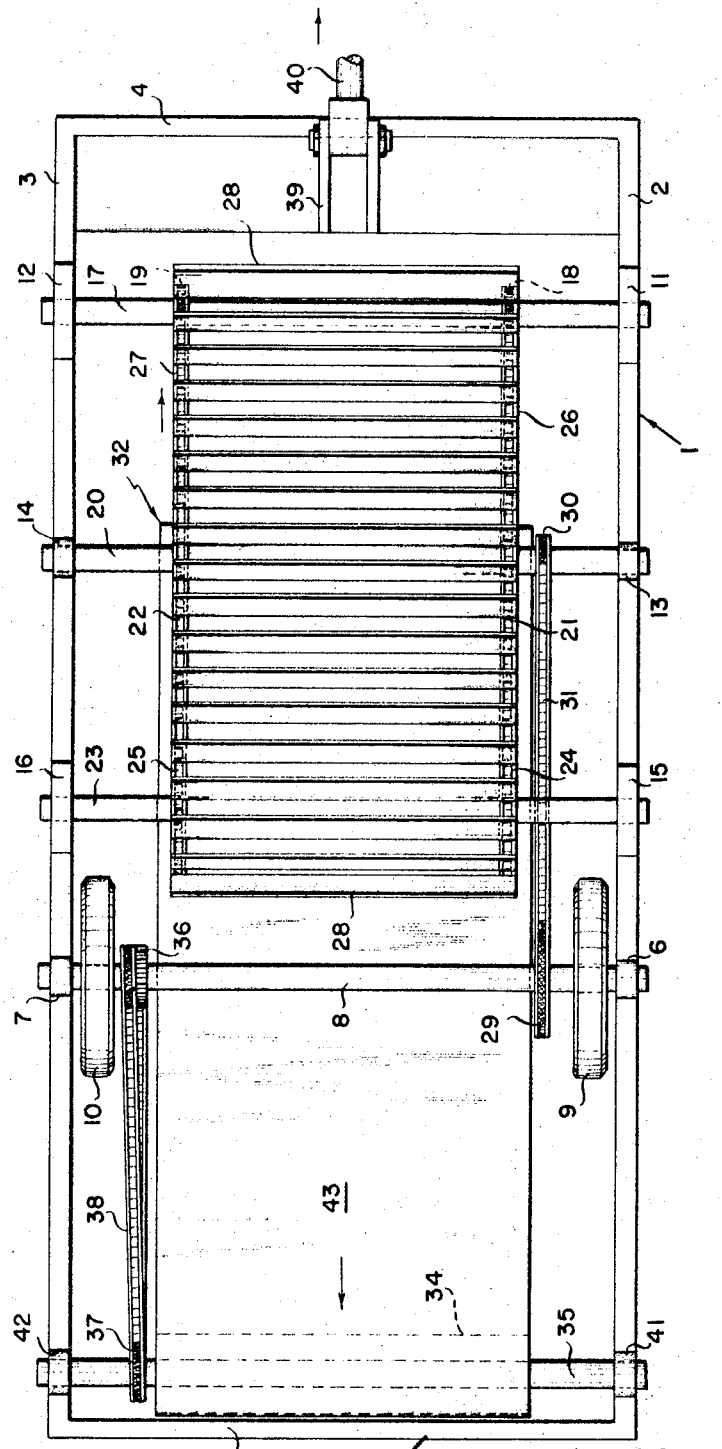

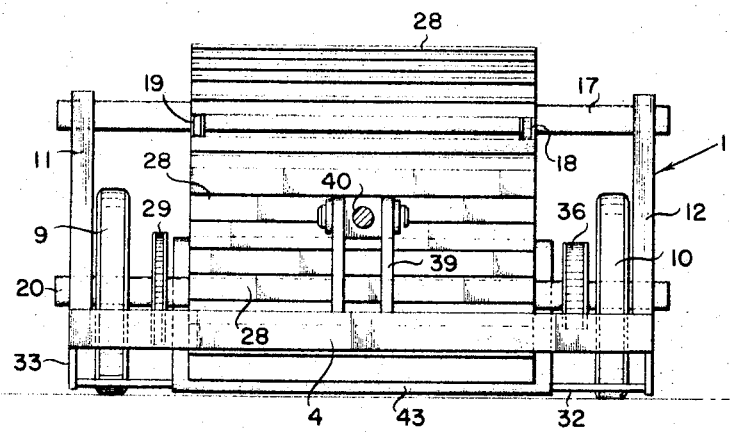
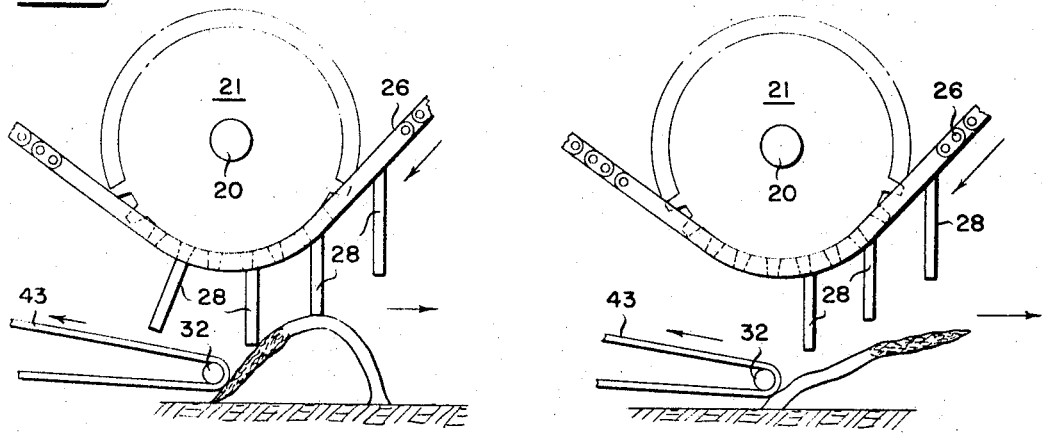
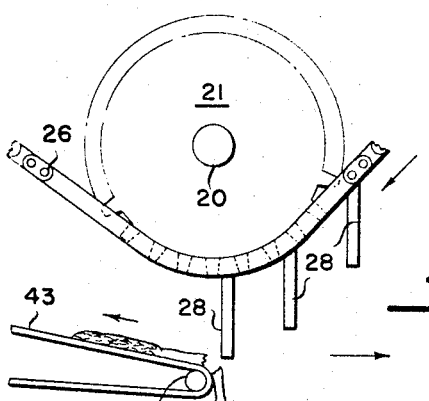
INVENTOR
Joseph George Francis

United States Patent Office 3,452,525
Patented July 1, 1969

3,452,525
PICKER FOR ASPARAGUS AND LIKE PRODUCTS AND PROCESS OF PICKING SUCH PRODUCTS
Joseph George Francis, Groton, Conn.
(R.R. 1, Mattawan, Mich. 49071)
Filed Oct. 22, 1965, Ser. No. 501,078
Int. Cl. A01d 45/00
U.S. Cl. 56—327                                          9 Claims

ABSTRACT OF THE DISCLOSURE

Method for harvesting asparagus and the like which comprises placing a supporting surface behind an upright stalk, maintaining the surface horizontally fixed with respect to the ground and passing a snapping surface below the lower edge of the supporting surface, causing said asparagus or the like spear to be snapped off, then collecting the severed spears. Apparatus specifically designed for carrying out the process.

---

The present invention relates to harvesters or pickers, and is more particularly concerned with apparatus particularly designed for harvesting or picking products such as asparagus having delicate stalks or spears, and a process therefor.

Many different types of apparatus have been disclosed in the art for harvesting crops such as vegetables. Many types of vegetables are of such nature that they may be picked by any type of machine utilizing processes such as shearing, breaking, or tearing. However, certain vegetables, such as asparagus, are very fragile. Consequently the spears thereof snap off quite easily. Additionally many vegetables such as asparagus are cmomonly grown in a random arrangement, and not in rows. As a result several unusual problems are encountered in the harvesting of such vegetables.

It is an object of the present invention to provide an apparatus for harvesting plants, and particularly delicate plants such as asparagus, without damaging the stalks or spears thereof. It is a further object to provide such an apparatus which can be adjusted to harvest the upper more tender portion of the stem of the plant, leaving the lower heavy tougher growth in the field. It is another object to provide an apparatus to harvest plants of the type described which removes the stems of the plant without damage or injury to the root system. It is an additional object to provide such an apparatus which may be so adjusted as to avoid injuring immature stalks which are not yet ready for harvesting. It is still a further object to provide an apparatus having conveyor means for loading the harvested plants into a suitable container without interfering with the continuous harvesting process. It is an additional object to provide an apparatus of the type described having means provided for supporting the plant stalks or spears in a vertical position while they are being cut or sheared. The accomplishment of the foregoing and additional objects will become more fully apparent hereinafter.

According to the invention, an apparatus is provided having a frame supported on wheels. Supporting means for the asparagus spears is provided comprising a plurality of planar abutment members, such as slats, which are maintained stationary with respect to the ground as they are lowered behind the asparagus spears. Means such as the forward position of a conveyor system is provided which is adapted to move forward with respect to the abutments and arranged to pass immediately below each abutment as the abutment reaches its lowest point of descent. The asparagus spears are supported by the abutments when at the point at which they are maintained at zero horizontal ground velocity. As the shearing means is passed below the abutments, the spears snap off and are caused to fall rearwardly onto the conveyor means. This condition is aided by choosing the shearing point as the point at which the abumtent just begins to acquire a negative ground velocity. Consequently, the spears are in motion rearwardly, and as they fall are caught by the conveyor belt moving rearwardly.

The invention in its preferred embodiment is illustrated by the accompanying drawings in which:

FIG. 1 is a side elevation of an apparatus according to the invention.

FIG. 2 is a top view of the apparatus of FIG. 1.

FIG. 3 is a front elevation.

FIG. 4 is a fragmentary side view illustrating the difficulty encountered when the belt supporting the vertical abutment members moves at such a velocity that the abutment members have a rearward horizontal component of motion with respect to the ground.

FIG. 5 illustrates the difficulty encountered when the belt supporting the vertical abutment members moves too slowly, so that the abutment members have a forward horizontal motion component with respect to ground; and FIG. 6 illustrates the operation resulting when the apparatus operates according to the invention with the vertical abutment members having a substantially zero horizontal motion component with respect to ground.

Reference is now made to the accompanying drawings for a better understanding of the invention, wherein all the parts are numbered and wherein the same numbers are used to refer to corresponding parts throughout.

Referring to the drawings, FIGS. 1–3 illustrate a harvester according to the invention having a frame 1 comprising a pair of longitudinal frame members 2 and 3 and a pair of transverse frame members 4 and 5 affixed thereto. A pair of axle supports 6 and 7 are mounted on the longtiudinal frame members. An axle 8 supporting a pair of wheels 9 and 10 is journaled in the axle supports 6 and 7.

The portion of the apparatus which provides the asparagus stalks with support against forward motion as they are being sheared is positioned forward of the wheels 9 and 10 and comprises a transport means having forward shafts supports 11 and 12, central shaft supports 13 and 14, and rearward shaft supports 15 and 16. A shaft 17 is journaled through suitable openings provided in the forward shaft supports 11 and 12, and is provided with a first rotary support means such as idler sprockets 18 and 19. A shaft 20 is journaled through suitable openings provided in the central shaft supports 13 and 14, and is provided with a second rotary support means such as drive sprockets 21 and 22 affixed thereto. A shaft 23 is journaled through suitable openings provided in the rearward shaft supports 15 and 16, and is provided with a third rotary support means such as idler sprockets 24 and 25. An endless slat drive chain 26 is engaged with the sprockets 18, 21, and 24. A second endless slat drive chain 27 is engaged with the sprockets 19, 22, and 25. Transversely affixed between the slat drive chains 26 and 27 are a plurality of slats or planar abutment members 28 so arranged that they are vertical with respect to the ground when positioned at a point between the forward sprockets 18 and 19 and central sprockets 21 and 22.

The slat drive chains 26 and 27 and the slats 28 affixed thereto are driven by means of a sprocket 29 affixed to the wheel axle 8, a sprocket 30 affixed to the shaft 17, and a chain 31 operatively engaging the sprockets 29 and 30.

The apparatus is also provided with a conveyor system comprising a small drum 32 mounted on a support 33 and a larger drum 34 mounted at the rear of the apparatus, having its shaft 35 journaled in drum supports 41 and 42 mounted on the frame of the apparatus. A flexible endless conveyor belt 43 is mounted over the drums 32 and 34. Power for the conveyor system is provided by means of a pulley 36 affixed to the axle 8, a pulley 37 affixed to the shaft 35, and a reversed belt 38.

The forward portion of the frame is provided with a draw bar mounting 39 having a draw bar 40 attached thereto for drawing the harvesting apparatus. The apparatus can of course be made self-propelled in conventional manner if desired.

In operation, the apparatus of the present invention is connected by means of the draw bar 40 to a device for drawing the apparatus, such as a tractor. As the apparatus is drawn through a field of growing vegetables, such as asparagus, the wheels 9 and 10 are caused to rotate. Consequently, the slat drive chains 26 and 27 and slats 28 affixed thereto are set in motion. As the apparatus moves forward, the portions of the slat drive chain and slats between the idler sprockets 18 and 19 and the drive sprockets 21 and 22 have a rearward motion component with respect to the apparatus. According to the invention, the apparatus comprising the drive sprocket and chains is so designed that the rearward component of the motion of the chains at points between the sprockets 18 and 19 and the drive sprockets 21 and 22 is equal to the rate of forward movement of the apparatus with respect to ground. Consequently, as the apparatus is drawn forward, the motion of the slats 28 at points between the sprockets 18 and 19 and the sprockets 21 and 22 is solely vertically downward and without any horizontal motion component. As the slats come downward, they position themselves behind asparagus spears and provide abutment support for the spears. As the shear bar end at drum 32 of the conveyor approaches, because of its relative forward motion with respect to the slats 28, it forces the spears against a slat abutment 28 and while passing under the slats, causes the spears to snap and to fall on the conveyor belt. The spears are transferred by the conveyor belt to the rear of the machine for further handling. The shear bar portion of the conveyor or shearing means is adjustable vertically by means of the support 33 and may be so adjusted as to shear off the spears at any desired height, or to avoid shearing immature spears below a certain minimum height.

Although it is not intended to be in any way limiting, suitable dimensions of and relationships between the various portions of the apparatus have been determined as follows: The wheels 9 and 10 may have a circumference of 43.5 inches. The relationship between the various sprockets, assuming a uniform tooth size which is suitable to provide the proper relative motion of the various parts, comprises a drive sprocket 29 having 22 teeth, a power transfer sprocket 30 having 10 teeth, and slat drive wheel sprockets 21 and 22 having 26 teeth, while the number of teeth for the idler sprockets 18 and 19 and the idler sprockets 24 and 25 are immaterial, as long as each complementary pair has the same number. The power drive chain 31 and the slat drive chains 26 and 27 may each be comprised of links of 1 inch lengths. Consequently, the slats between the sprockets 18 and 19 and the sprockets 21 and 22 travel 57.2 inches per revolution of the wheels 9 and 10, or an increase in volocity of 31.5 percent. The angle theta, represented in FIG. 1, is so chosen (approximately 40 degrees) that while the slats are moving between the sprockets 18 and 19 and the sprockets 21 and 22 they have a horizontal motion velocity of substantially zero with respect to ground. In other words, the horizontal motion component of the slats in that zone with respect to the apparatus is equal and opposite to the forward horizontal motion component of the apparatus with respect to ground. The conveyor shearing means such as a shear bar or forward drum 32 is normally set at approximately 2.5 inches above ground, but is adjustable for other heights. The slats 28 may be approximately three feet long and 2.5 inches wide. A suitable gap between slats is two inches, although this dimension may vary to compensate for various chain sizes, since the slats must be secured to the center of the links which link may slightly exceed two inches. The slats should pass over the shear bar with about 1.5 inches clearance to provide proper shearing of the spears.

FIGS. 4–6 illustrate the consequences of proper and improper synchronization among the various moving parts determining the transport speed of the abutment members. FIG. 4 illustrates the consequences of abutment member movement which is too rapid. As can be seen, the abutment members or slats 28 have engaged the asparagus spear and thrown it rearwardly before the forward portion of the conveyor has reached the base of the spear. This condition results in severe mangling of the spear, breakage of the spear into several pieces, and frequently in complete loss of the spear. FIG. 5 illustrates the consequences of too slow movement of the abutment members 28. In this case, the asparagus spear is encountered by the conveyor belt end before support can be provided by the abutment members. As a consequence, the spear is pushed over and snapped off uncleanly, if at all, and is usually left in the field ungathered by the conveyor system.

FIG. 6 illustrates the operation of a properly synchronized apparatus, showing the abutment members 28 providing stationary support for the spear as the shear means, i.e., the conveyor, approaches, makes contact with the spear, and cleanly snaps off the spear at the proper height.

Moreover, in any case where the slats or abutment members are positioned at a relatively small acute angle, they tend to trap the asparagus spears and to return them to the forward portion of the apparatus. To prevent this result, the angle between the abutment members and the chain drive may advantageously be increased by lowering of the forward set of sprockets 18 and 19 in order to maintain the abutment members positioned perpendicularly with respect to ground between the forward sprockets 18 and 19 and the central sprockets 21 and 22. Alternatively, the abutment members may be designed to be narrower. Additionally the rear sprockets 24 and 25 may sometimes advantageously be lowered to reduce the angle of the abutment members 28 with respect to the vertical to prevent entrapment of spears.

The shaft supporting the sprockets 21 and 22 ordinarily presents no problems. However, at high speeds the shaft may strike the tips of taller spears, sometimes causing destruction of the asparagus tips. This can be avoided by utilizing larger sprockets, permitting the shaft on which the sprockets are mounted to be elevated.

In its broader aspects, other shear means, e.g., a shear bar, can replace the forward conveyor tip, and other conventional means, e.g., a bin, may be employed. However, apparatus embodying the conveyor means as disclosed and described is much preferred for obvious reasons.

The present invention provides a harvester particularly suitable for harvesting vegetables such as asparagus having upright fragile stalks or spears. The harvester provides support for the individual stalks as they are sheared to prevent their destruction. Conveyor means is provided to transport the sheared spears to the rear of the harvester where they may be collected for further processing. The apparatus is so designed that substantially all the harvested product is transported to the rear of the apparatus and very few stalks are thrown forward in the direction of the operator. The apparatus is reliable and may be constructed relatively inexpensively. It is entirely automatic and does not require a skilled operator.

It is to be understood that the invention is not limited to the exact details of construction, operation, or exact materials or embodiments shown and described, as obvious modifications and equivalents will be apparent to one skilled in the art.

I claim:

1. A plant harvester adapted to be moved in a forward horizontal direction comprising a supported frame, transport means mounted on said frame, and a plurality of planar abutment members mounted consecutively on said transport means in transverse orientation, drive means, transmission means operatively connecting said drive means with said transport means and arranged to drive said transport means at a reverse horizontal velocity with respect to said harvester frame equal to the forward horizontal velocity of said frame, said transport means and drive means being so arranged and said abutment members being so mounted that when said harvester is moved forward, said abutment members are caused to descend to a predetermined height above ground level while being maintained in substantially vertical position and at substantially zero horizontal velocity with respect to ground, and shear means positioned below said abutment members at their lowest point of descent, whereby said planar members descend and support growing plant stalks encountered by said harvester against forward horizontal motion while the forward motion of said harvester causes said shear means to snap off said stalks below the area of support; and means for collecting the severed stalks.

2. A plant harvester adapted to be moved in a forward horizontal direction comprising a supported frame, transport means mounted on said frame, and a plurality of planar abutment members mounted consecutively on said transport means in transverse orientation, drive means, transmission means operatively connecting said drive means with said transport means and arranged to drive said transport means at a reverse horizontal velocity with respect to said harvester frame equal to the forward horizontal velocity of said frame, said transport means and said drive means being so arranged and said abutment members being so mounted that when said harvester is moved forward, said abutment members are caused to descend to a predetermined height above ground level while being maintained in substantially vertical position and at substantially zero horizontal velocity with respect to ground, a conveyor comprising an endless belt and rotative means mounted at each end of said conveyor supporting said belt, and means for driving said conveyor, one end of said conveyor being positioned below said abutment members at their lowest point of descent, whereby said planar members descend and support growing plant stalks encountered by said harvester against forward horizontal motion while the forward motion of said harvester causes the forward end of said conveyor to snap off said stalks below the area of support and causes said conveyor to transport said stalks rearwardly for further processing.

3. A plant harvester adapted to be moved in a forward horizontal direction comprising a frame supported on wheels, transport means comprising a first rotary supporting means rotatably mounted on said frame, a second rotary supporting means rotatably mounted on said frame and positioned downwardly and horizontally spaced apart with respect to said first rotary supporting means, flexible endless support means mounted over and engaging said first and second rotary supporting means, and a plurality of planar abutment members consecutively arranged in transverse orientation with respect to and affixed to said endless support means, said abutment members being so mounted that they are substantially vertically positioned when oriented on the portion of said endless support means connecting the lower portions of said first and second rotary support means, and drive means adapted to drive said transport means at such a speed and direction that the horizontal component of the linear velocity of said abutment members when proceeding from said first to said second rotary supporting means is substantially zero with respect to ground, and shear means positioned below the lower edge of said abutment members at their lowest point of descent, whereby said abutment members descend and support plant stalks encountered by said harvester against forward horizontal motion while said shear means advances and snaps off said stalks below said area of support, and means for collection of said thus-severed stalks.

4. A plant harvester adapted to be moved in a forward horizontal direction comprising a frame supported on wheels, transport means comprising a first rotary supporting means rotatably mounted on said frame, a second rotary supporting means rotatably mounted on said frame and positioned centrally and downwardly and horizontally spaced apart with respect to said first rotary supporting means, and a third rotary supporting means rotatably mounted on said frame and positioned rearwardly and upwardly with respect to said second rotary supporting means, flexible endless support means mounted over and engaging said first, second, and third rotary supporting means, and a plurality of planar abutment members consecutively arranged in transverse orientation with respect to and affixed to said endless support means, said abutment members being so mounted that they are substantially vertically positioned when oriented on the portion of said endless support means connecting the lower portions of said first and second rotary support means, and drive means adapted to drive said transport means at such a speed and direction that the horizontal component of the linear velocity of said abutment members when proceeding from said first to said second rotary supporting means is substantially zero with respect to ground, and a conveyor comprising an endless belt and rotative means mounted at each end of said conveyor supporting said belt and means for driving said conveyor, one end of said conveyor being positioned below the lower edge of said abutment members at their lowest point of descent, whereby said abutment members descend and support plant stalks encountered by said harvester against forward horizontal motion while the end of said conveyor means advances and snaps off said stalks, and whereby said conveyor means transports said stalks rearwardly for further processing.

5. A plant harvester adapted to be moved in a forward horizontal direction comprising a frame supported on wheels, transport means comprising a first pair of parallel spaced-apart sprockets rotatably mounted on said frame, a second pair of parallel spaced-apart sprockets rotatably mounted on said frame and positioned downwardly and horizontally spaced apart with respect to said first pair, the sprockets positioned on each side of said transport means being substantially coplanar, a pair of endless chains mounted one over and engaging each group of coplanar sprockets, and a plurality of planar abutment members consecutively arranged in transverse orientation with respect to said chains and affixed at each end to one of said chains, said abutment members being so mounted that they are substantially vertically oriented when positioned on the portion of said chains connecting the lower portions of said first and second pairs of sprockets, drive means adapted to drive said transport system at such a speed and direction that the horizontal component of the linear velocity of said abutment members when proceeding from said first to said second pairs of sprockets is substantially zero with respect to ground, and shear means positioned below the lower edges of said abutment members at their lowest point of descent, whereby said abutment members descend and support plant stalks encountered by said harvester against forward horizontal motion while said shear means advances and snaps off said stalks below said area of support, and means for collection of thus-severed stalks.

6. A plant harvester adapted to be moved in a forward horizontal direction comprising a frame supported on wheels, transport means comprising a first pair of parallel spaced-apart sprockets rotatably mounted on said frame, a second pair of parallel spaced-apart sprockets rotatably mounted on said frame and positioned downwardly and horizontally spaced apart with respect to said first pair, the sprockets positioned on each side of said transport means being substantially coplanar, a pair of endless chains mounted one over and engaging each group of coplanar sprockets, and a plurality of planar abutment members consecutively arranged in transverse orientation with respect to said chains and affixed at each end to one of said chains, said abutment members being so mounted that they are substantially vertically oriented when positioned on the portion of said chains connecting the lower portions of said first and second pairs of sprockets, drive means adapted to drive said transport system at such a speed and direction that the horizontal component of the linear velocity of said abutment members when proceeding from said first to said second pairs of sprockets is substantially zero with respect to ground, and a conveyor comprising an endless belt and rotative means mounted at each end of said conveyor supporting said belt, and means for driving said conveyor, one end of said conveyor being positioned below the lower edges of said abutment members at their lowest point of descent, whereby said abutment members descend and support plant stalks encountered by said harvester against forward horizontal motion while the end of said conveyor means advances and snaps off said stalks below said area of support, and whereby said conveyor means transports said thus-severed stalks rearwardly for further processing.

7. An asparagus harvester adapted to be moved in a forward horizontal direction comprising a frame supported on wheels, transport means comprising a first pair of parallel spaced-apart sprockets rotatably mounted on said frame, a second pair of parallel spaced-apart sprockets rotatably mounted on said frame and positioned centrally and downwardly and horizontally spaced apart with respect to said first pair, and a third pair of parallel spaced-apart sprockets rotatably mounted on said frame and positioned rearwardly and upwardly with respect to said second pair, the sprockets positioned on each side of said transport means being substantially coplanar, a pair of endless chains mounted one over and engaging each group of coplanar sprockets, and a plurality of planar abutment members consecutively arranged in transverse orientation with respect to said chains and affixed at each end to one of said chains, said abutment members being so mounted that they are substantially vertically oriented when positioned on the portion of said chains connecting the lower portions of said first and second pairs of sprockets, drive means adapted to drive said transport system at such a speed and direction that the horizontal component of the linear velocity of said abutment members when proceeding from said first to said second pairs of sprockets is substantially zero with respect to ground, and a conveyor comprising an endless belt and rotative means mounted at each end of said conveyor supporting said belt, and means for driving said conveyor, one end of said conveyor being positioned below the lower edges of said abutment members at their lowest point of descent, whereby said abutment members descend and support asparagus spears encountered by said harvester against forward horizontal motion while the end of said conveyor means advances and snaps off said spears below said area of support, and whereby said conveyor means transports said spears rearwardly for further processing.

8. A method for harvesting upright vegetable stalks which comprises placing a vertically oriented supporting surface behind said upright stalk, maintaining said surface horizontally fixed with respect to ground, and passing a horizontally arranged snapping means having a non-cutting surface below the lower edge of said supporting surface, thereby causing said stalk to be snapped off, and collecting said thus-severed stalks.

9. A method for harvesting asparagus spears which comprises placing a vertically oriented supporting surface behind said spears, maintaining said surface horizontally fixed with respect to ground, and passing a horizontally arranged snapping means having a non-cutting surface below the lower edge of said supporting surface, thereby causing said spears to be snapped off, and collecting said thus-severed spears.

References Cited
UNITED STATES PATENTS

| | | | |
|---|---|---|---|
| 3,066,469 | 12/1962 | Chatagnier | 56—327 |
| 3,176,456 | 4/1965 | Franzen | 56—327 |
| 3,236,038 | 2/1966 | Gates et al. | 56—327 X |

LUCIE H. LAUDENSLAGER, Primary Examiner.